United States Patent [19]

Koseki et al.

[11] Patent Number: 5,410,480
[45] Date of Patent: Apr. 25, 1995

[54] METHOD OF GUIDING TRAVEL OF GOLF CARTS

[76] Inventors: Masamori Koseki, No. 13-15, Higashishinmachi, Itabashi-ku, Tokyo, 174; Hiroo Shoji, No. 31-5-406, Yoyogi, 5-chome, Shibuya-ku, Tokyo 150; Ken Miura, No. 34-20, Honcho, 3-chome, Hatogaya-shi, Saitama-ken, 334, all of Japan

[21] Appl. No.: 131,597

[22] Filed: Oct. 5, 1993

[30] Foreign Application Priority Data

Oct. 8, 1992 [JP] Japan .................. 4-293925
Dec. 2, 1992 [JP] Japan .................. 3-345095

[51] Int. Cl.⁶ .................. G05D 1/02; G06F 15/50
[52] U.S. Cl. .................. 364/424.02; 364/424.01; 318/587; 180/167
[58] Field of Search ........... 364/424.02, 461, 424.01, 364/449, 447, 453; 318/580, 587; 180/168, 141, 79.1

[56] References Cited

U.S. PATENT DOCUMENTS

| | | | |
|---|---|---|---|
| 3,668,624 | 6/1972 | Spaulding | 340/32 |
| 4,656,406 | 4/1987 | Houskamp | 318/587 |
| 4,864,207 | 9/1989 | Miura et al. | 318/587 |
| 5,000,279 | 3/1991 | Kondo et al. | 180/168 |
| 5,034,673 | 7/1991 | Shoji et al. | 318/587 |
| 5,107,946 | 4/1992 | Kamimura | 364/424.02 |
| 5,218,542 | 7/1993 | Endo et al. | 364/424.02 |
| 5,219,036 | 7/1993 | Schwager et al. | 364/424.02 |

FOREIGN PATENT DOCUMENTS

| | | |
|---|---|---|
| 622986 | 4/1992 | Australia . |
| 633308 | 1/1993 | Australia . |
| 5-6884 | 1/1993 | Japan . |

*Primary Examiner*—Kevin J. Teska
*Assistant Examiner*—Tan Q. Nguyen
*Attorney, Agent, or Firm*—Jacobson, Price, Holman & Stern

[57] ABSTRACT

A method of guiding the travel of golf carts, wherein a marker line is formed of cart guides and is sensed by the golf carts through guide sensing means. The carts are advanced to trace along the marker line and each of the carts is automatically steered so as not to repeatedly pass over the same route. A travel switching detector or sensing element is laid at an arbitrary part of, or in the vicinity of, the marker line. When sensing the travel switching detector, the carts are, after sensing, traveled further to trace along the marker line by different distances for each of the golf carts. After having run on the particular distances, the carts are advanced while turning the steering angles in predetermined directions, and after having traveled a predetermined distance, the carts travel while turning the steering angles in opposite directions.

8 Claims, 8 Drawing Sheets

FIG_1
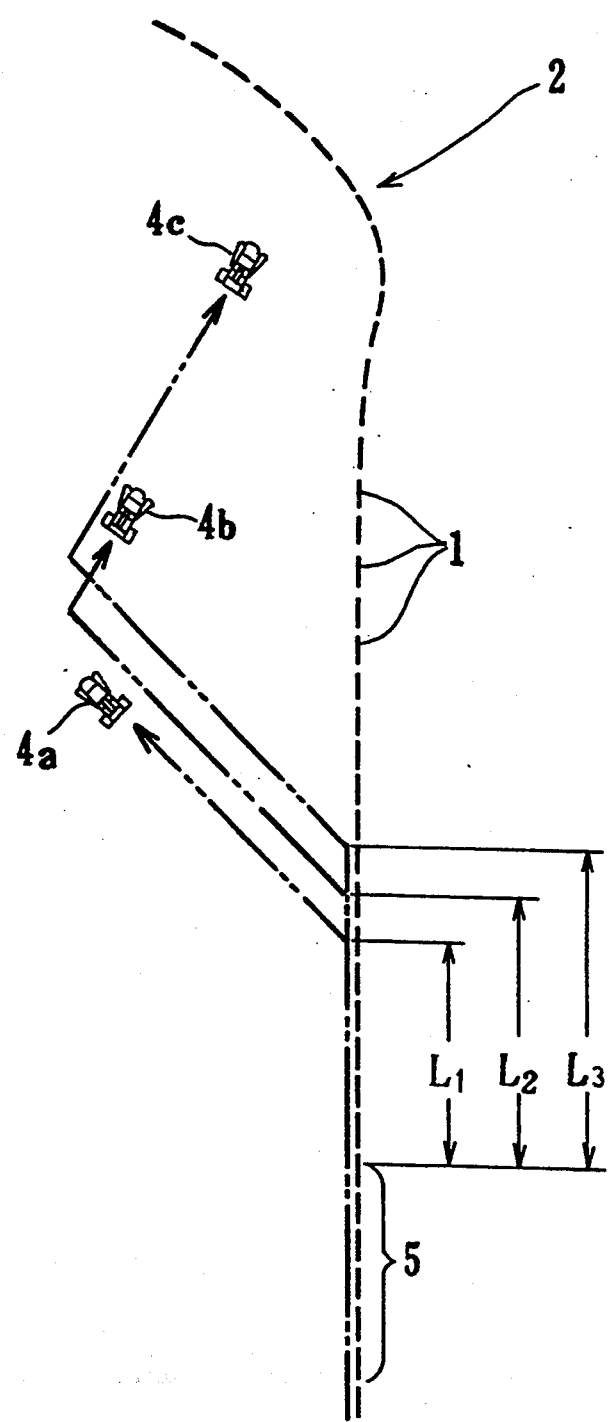

FIG_2
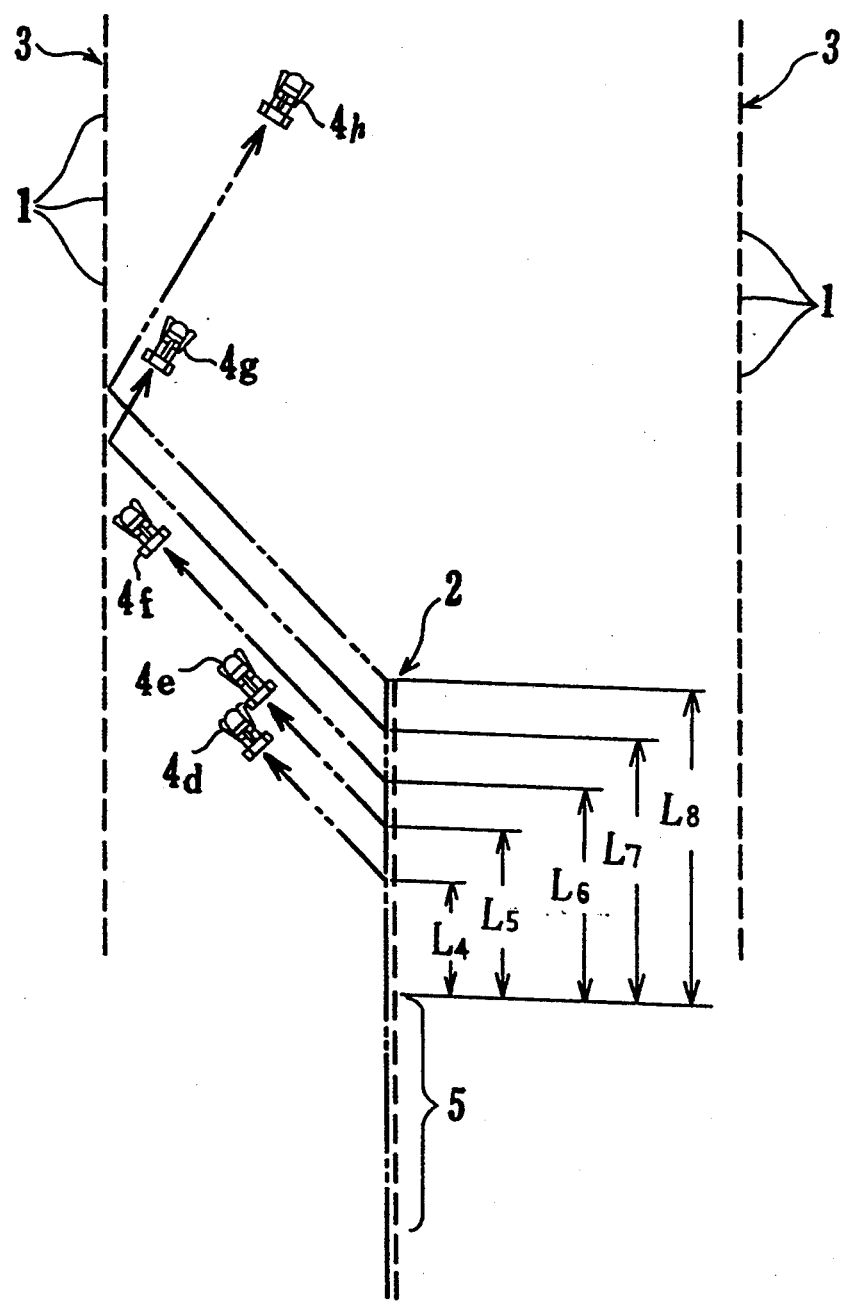

FIG_3
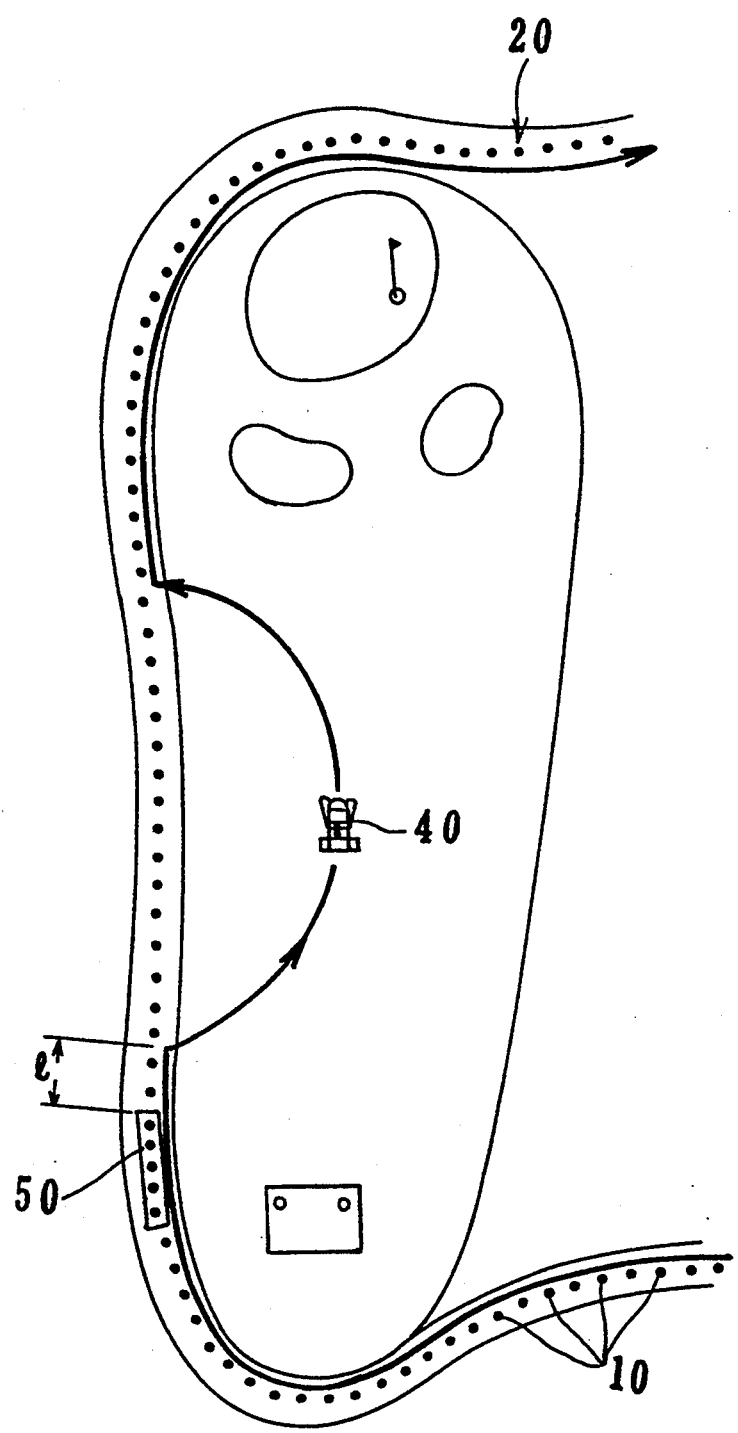

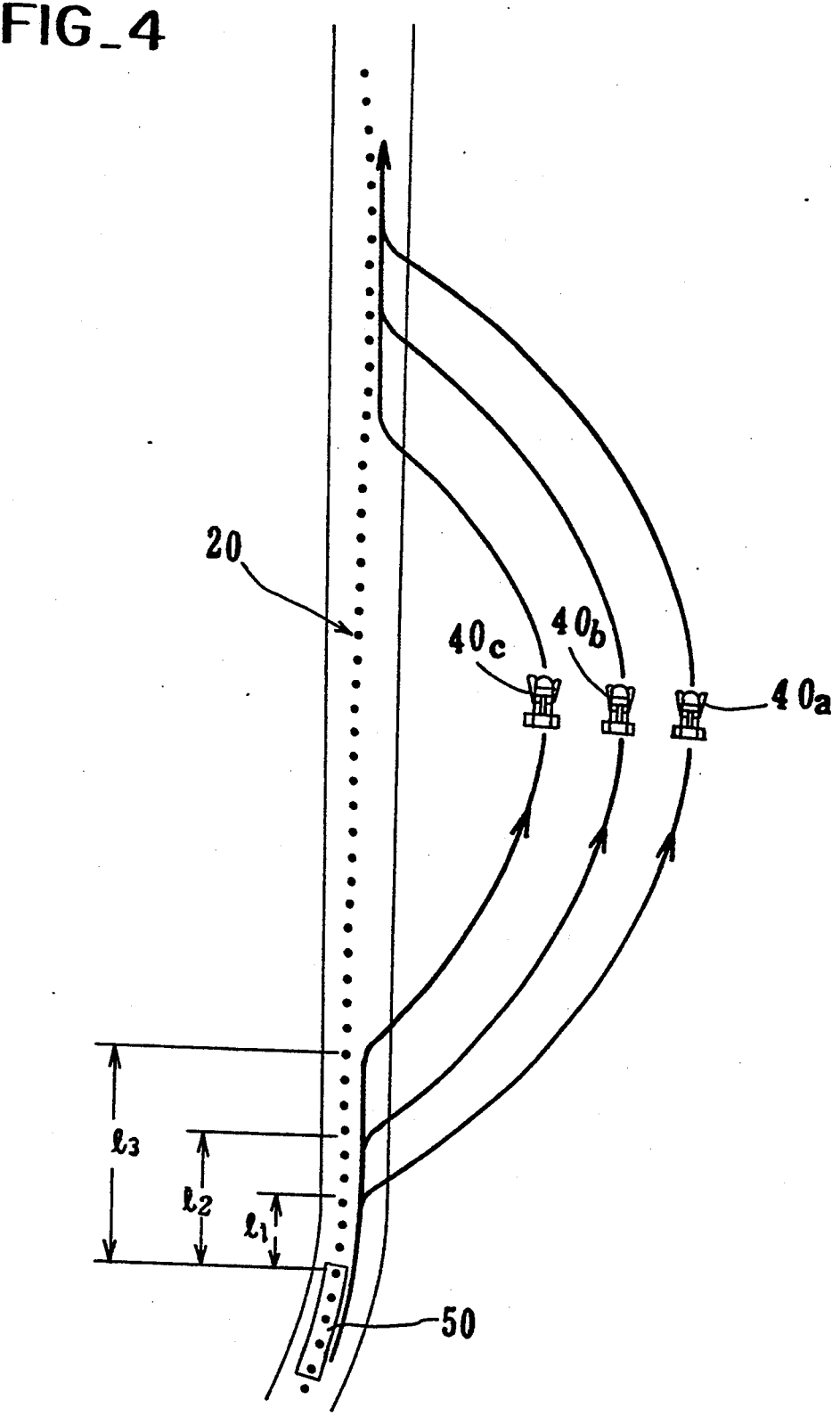

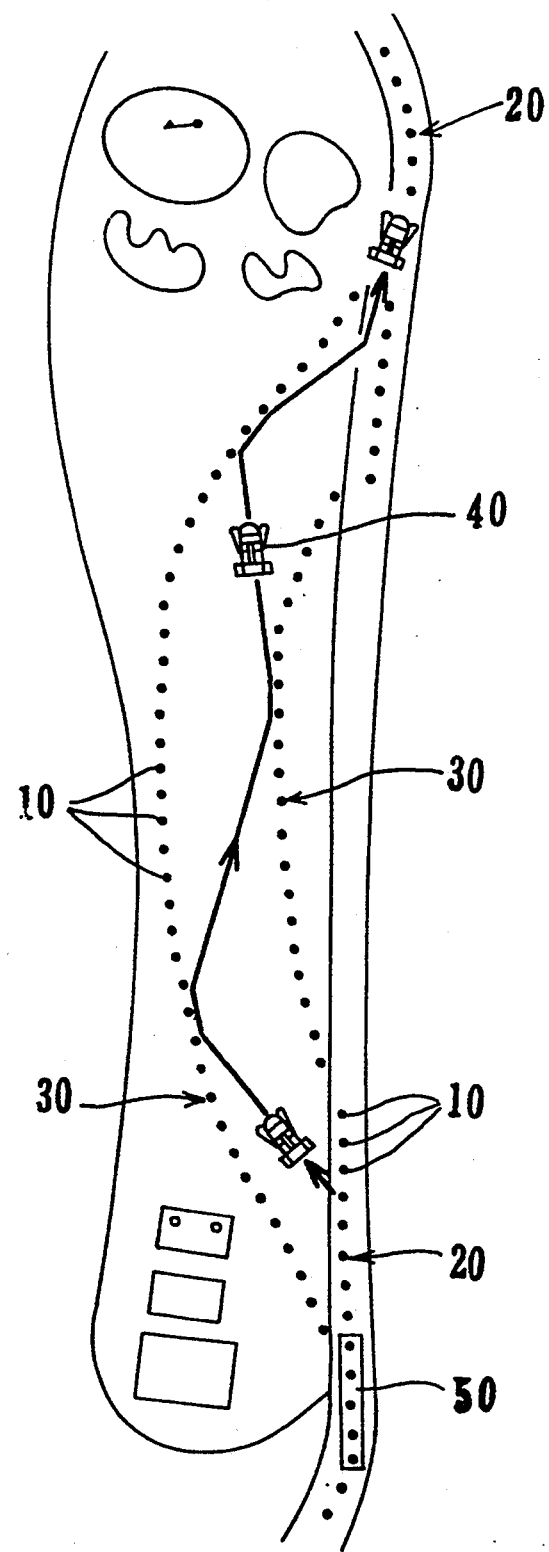
FIG_5

FIG_6
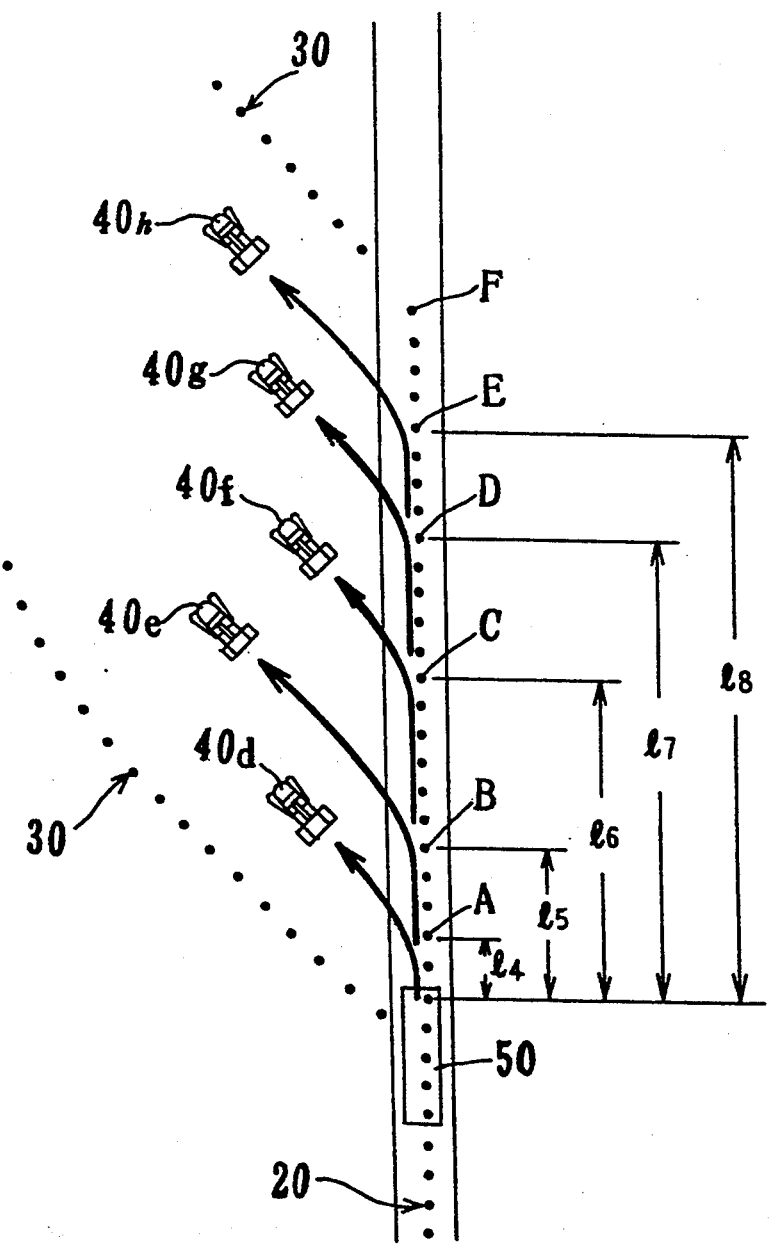

FIG_7
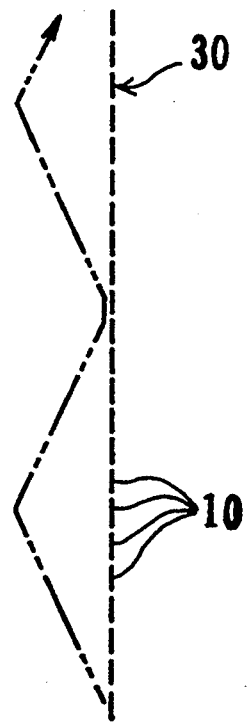
FIG_8
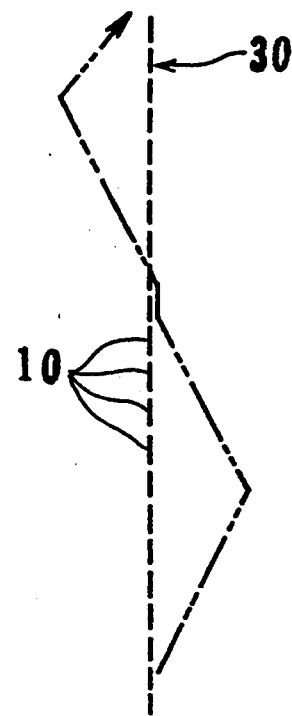

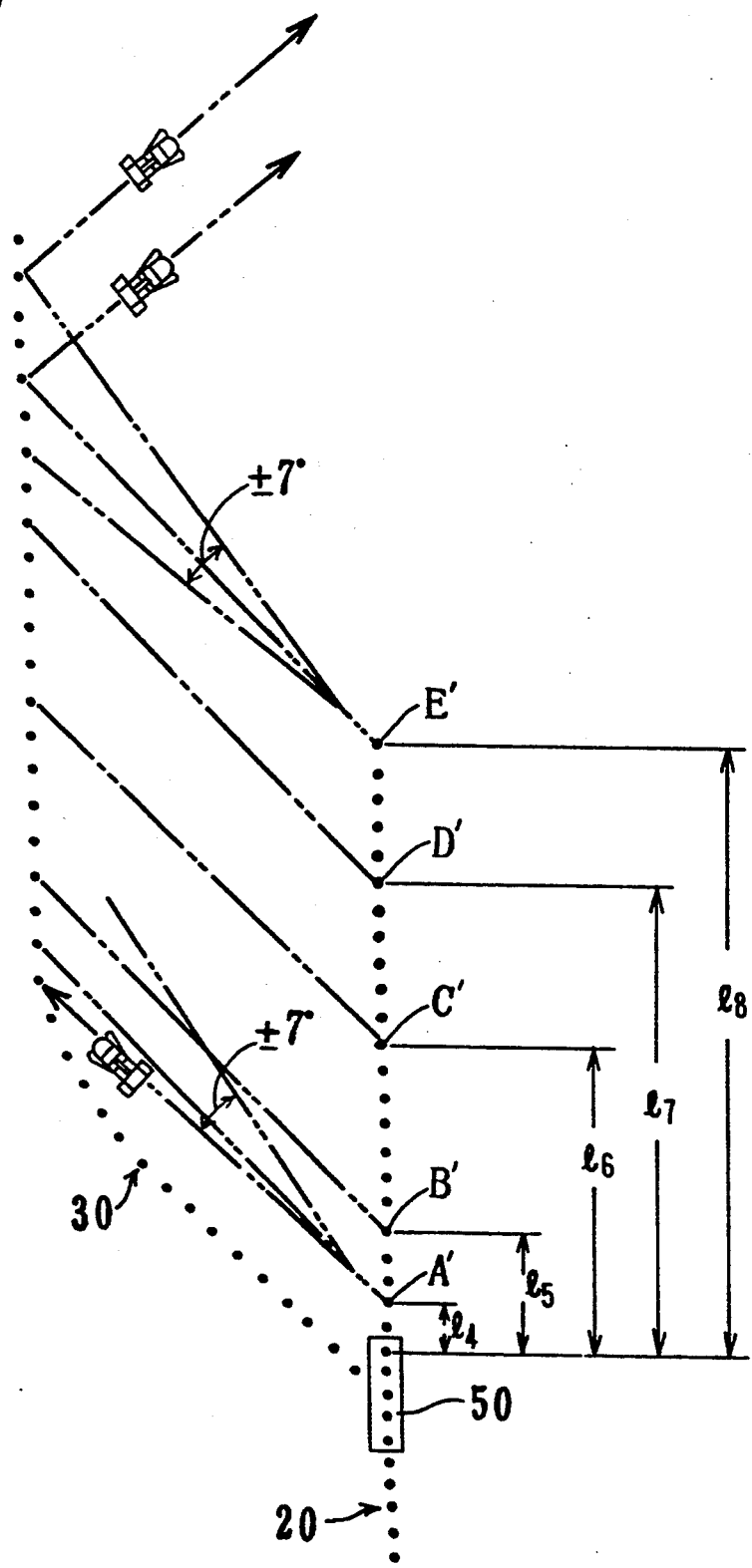
FIG_9

METHOD OF GUIDING TRAVEL OF GOLF CARTS

FIELD OF THE INVENTION

This invention relates to a method of guiding unmanned golf carts to travel along golf courses.

BACKGROUND OF THE INVENTION

Heretofore, unmanned carts for a golf course are of, a rail road type in which rails are laid on the ground and a cart travels thereon, and a magnetic force guiding type in which magnetic elements are buried under a ground surface of a fairway to form a marker line and the cart runs by sensing the magnetic force on a paved road corresponding to the marker line. The rails are, however, exposed on the fairway in the rail road type, and the paved road is exposed on the fairway in the magnetic force guiding type of the. These systems result in obstructions in playing golf, and undesirable problems arise in the play.

On the other hand, if the magnetic force guiding type is improved to form the marker line under the ground surface, the obstruction in the play is eliminated, but the lawn surface is damaged along the route for the cart running.

In view of the above stated problems, the inventors have devised a method, a so-called "random traveling type", of guiding travel of the cart, while turning steering angles thereof in a predetermined area. In particular, they have proposed as one example the golf cart guiding methods in Japanese Patent Laid Open Nos. 118704/90 and 6884/93 in which the cart guides are buried under the ground surface of the fairway to form the marker line, so that the cart advances along the marker line, while turning the steering angles thereof, according to the random traveling methods including the above mentioned applications.

The random running of the cart on the fairway is significant for the above stated reasons, but in other places, for example, the running on a connection way to a next hole does not require the random running of the cart. Rather the cart should be rapidly moved for the next players, and so the running on a predetermined route in the shortest distance is desirable. Therefore, when the above stated random guiding method is applied to an actual golf course, in general, until the cart enters the hole, it runs on the predetermined route, such as the paved road, and when going into the hole, the cart is steered in the random type.

However, when starting the random running, if the starting point is the same as to each of the carts, the carts might pass, or repeat, the same route, insofar as the steering angles of the carts are not changed, and there arises a problem that the lawn is damaged thereby.

Even though the steering angles of the carts are changed, if the carts run on the same route in a certain range from said starting points, there also arises a problem that the lawn in said range is damaged.

By contrast, when starting the random running, if each of the carts is manually pushed to slightly deviate the starting point or the steering angle, the running on the same route can be avoided, but this is complicated, because the cart is manually pushed at each time of starting the cart.

The present invention has been realized in view of the above said problems, and is to provide a method of guiding to travel the golf cart in which each of the carts is automatically steered not to pass the same route, particularly paying attentions to the starting points of the random running.

SUMMARY OF THE INVENTION

For accomplishing the objects of the present invention, the method of guiding travel of the golf cart in one embodiment is provided by advancing the golf cart as a tracing along a marker line which is formed by laying the cart guides on or under the ground surface, and by causing the golf carts to sense the marker lines through guide sensing means. Travel switching sensors are laid in arbitrary parts in the marker lines or vicinities therearound. In traveling, when sensing said sensors, each of the golf carts is traced along the marker line by a different distance per each of the carts after said sensing. The carts are advanced while turning the steering angle thereof in a predetermined direction after having advanced on said distance, and then the steering angles are changed in an opposite direction with respect to the marker line.

The method of guiding to advance the golf cart in another embodiment is provided by laying different kinds of cart guides on or under the ground surface to form the marker lines which are formed of one cart guide behind another marker lines formed of the other cart guide toward the cart running direction, causing the golf cart to sense the marker line through guide sensing means, so that the golf cart is advanced as a tracing along the marker line while sensing one cart guide and the golf cart is advanced along the marker line as changing the steering angles while sensing another cart guide, comprising the steps of laying travel switching sensors at optional positions on or in the vicinities of the marker line formed of said one cart guides traveling, when sensing the travel switching sensors, each of the golf carts by deviating at each different distance per each of the carts after such sensing, and then advancing as changing the steering angles after having run on said distance.

In the invention as stated above, the cart guide of forming the marker line may be sensed by known sensing means, for example, a light reflection tape based on a light reflection sensing type or a flat sensor to be sensed by an image sensor. However, when taking the scenery of the golf course into consideration, those sensors to be buried under the ground surface are desirable, and magnetic elements or electromagnetic induction conductors to be sensed by magnetic sensing means are particularly desirable.

Explanations will be made in detail to an embodiment of the inventive method with reference to the attached drawings.

BRIEF DESCRIPTION OF THE DRAWINGS

FIG. 1 is an explanatory view showing an outline of an embodiment of the invention;

FIG. 2 is an explanatory view showing an outline of another embodiment of the invention;

FIG. 3 is an explanatory view showing a variation of the first embodiment;

FIG. 4 is an explanatory view explaining an essential part of turning steering angles of the carts;

FIG. 5 is an explanatory view showing another embodiment of this invention;

FIG. 6 is an explanatory view showing a starting ground point for turning steering angles of the carts;

FIG. 7 is an explanatory view when the cart runs at random along only one side of the marker line;

FIG. 8 is an explanatory view when the cart runs at random crossing the marker line; and FIG. 9 is an explanatory view showing a modification of the steering angle of the cart;

In the drawings, the reference numerals 1 and 10 designate magnetic elements; and 20 are S pole marker lines; 3 and 30 are N pole marker lines; 4 and 40 are carts; and 5 designates a travel switching detector.

DESCRIPTION OF THE PREFERRED EMBODIMENTS

In FIG. 1, the premise of the guiding method is based on magnetic elements 1 buried under the ground surface to form the marker line 2, allowing the golf cart 4 to sense the marker line 2 via a magnetic sensor, so that the golf cart 4 is advanced as tracing along the marker line 2. In such a structure, the travel switching sensors 5 are laid on the way of the marker line 2. Herein, a predetermined arrangement of the pole (e.g., N N S N N, etc.) which is formed by burying the magnetic elements 1 of both poles (S pole and N pole), is employed as the travel switching sensor 5. When the magnetic sensor of the golf cart 4 senses the predetermined arrangement of the magnetic pole as the travel switching sensor 5, each golf cart 4, after sensing, is traveled as tracing along the marker line 2 by each different distance L per each of the carts 4. That is, the cart 4a runs by a distance $L_1$, the cart 4b runs by a distance $L_2$, and the cart 4c runs by a distance $L_3$, and after having run at the predetermined distance, the steering angle of the cart 4 is turned in predetermined directions with respect to the marker line. Therefore, each of the carts 4a to 4c is provided with a control means for running by an optional distance L when sensing the predetermined magnetic arrangement, steering thereafter, running on the predetermined distance, and changing the steering in an opposite direction with respect to the marker line. The setting of the running distance L in the control means is made different in each cart 4.

In FIG. 2, the premise of the guiding method is based on magnetic elements 1 buried under the ground surface to form a marker line 3 comprising the magnetic element 1 of one magnetic pole (e.g., N poles) past the marker line 2 comprising the magnetic element 1 of the other magnetic pole (e.g., S poles) in the cart running direction, so that the golf cart 4 is traveled on the predetermined route as tracing along the marker line 2 when the cart 4 senses the marker line 2, and the cart 4 is advanced along the marker line 3 by changing the steering angle when sensing the marker line 3, thereby to switch the golf cart 4 between the predetermined route and the random route. In the above stated structure, similar to that of FIG. 1, one part along the way of the marker line 2 is provided with the travel switching sensor 5 so as to form a predetermined arrangement of the poles (e.g., N N S N N, etc) by burying the magnetic elements 1 of both poles (S pole and N pole). When the magnetic sensor of the golf cart 4 senses said predetermined magnetic arrangement to be the travel switching sensor 5, each golf cart 4 is traveled as it does on the optional distance L after such sensing. That is, the cart 4d runs by $L_4$, the cart 4e runs by $L_5$, the cart 4f does by $L_6$, the cart g does by $L_7$, and the the cart 4h does by $L_8$, and thus the cart 4 is advanced after such runnings as changing the steering angles. So, each of the carts 4d to 4h is provided with a control means which controls the runnings on the predetermined route and the random route and travels the cart at the arbitrary distance when sensing the predetermined magnetic arrangement and then controls the steerings. The determination of the running distance by the control means is made different in each cart 4.

According to the above structures, in either of the cases of FIGS. 1 and 2, when starting the random travel, since the turning positions of the steering angles of the cart 4 are different, and the starting positions of the random travels depending upon the carts 4a to 4h, and though the steering angles of the respective carts are the same, the travels are automatically switched so as not to run on the same ways.

Incidentially, the carts of the golf courses might run on the same courses many times a day. In such cases, even if the running routes of the respective carts are changed, the same carts run several times on the same routes on the same day, and so the carts might damage the lawn. It is desirable that each time a sensing of the travel switching detector occurs, the distance for the cart running is changed within and optional range.

Similarly, the steering angles of the golf cart may be also changed within the arbitrary range.

The embodiments of the invention will now be explained referring to the attached drawings. It should be emphasized that the present invention is not limited to the specifically described embodiments.

In a first embodiment, as seen in FIG. 3, the magnetic elements 10 are buried at a suitable depth under the ground surface of the cart road provided by the side of the golf course so as to form the marker line 20.

The marker line 20 comprises all the magnetic elements 10 of the S pole except the travel switching sensors 50 along the way of the marker line 20. The travel switching sensor 50 is formed with a predetermined arrangement of a combination of the magnetic elements 10 of the S poles or N poles. In this embodiment, the sensor 50 is "N N S N N" composed of five magnetic elements 10.

The cart 40 is provided with a magnetic sensor (not shown) for sensing the pole of the buried magnetic element 10 and its magnetic force, and a controller (not shown) for controlling the steering of the travel based on an output issued from the magnetic sensor.

The controller has a pole discriminating circuit for controlling to the running the determined route when the pole discriminating circuit goes on to discriminate the S pole. The steering control of the determined route is similar to that in the second embodiment and will be referred to in detail. The pole discriminator can read an arbitrary pole arrangement, and when reading the arbitrary pole arrangement, the golf cart 40, after sensing, runs by an arbitrary distance l, and the golf cart 40, after running, advances while turning the steering angle thereof. After the cart 40 has run along the predetermined distance, the steering angle of the cart 40 is turned in an opposite direction with respect to the marker line. In this embodiment, the turning of the steering angle of the cart 40 is not linearly conducted as seen in FIG. 1, but is set as drawing a circular arc as seen in FIG. 3. Further, the pole arrangement "N N S N N" of the travel switching detector 50 is arbitrary, and is controlled as described above when this arrangement is read. This control is set by changing the running distance l per each golf cart 40. More specifically, as shown in FIG. 4, the cart 40a is set as $l_1$, the cart 40b is set as $l_2$, and the cart 40c is set as $l_3$. The predetermined distance is so set as to be different per each cart 40 after the steering angle has been turned until the steering angle is further turned in the opposite direction with respect to the marker line, however these distances may be set to be the the same as the cart 40.

The runnings in this embodiment will be described referring to FIGS. 3 and 4.

The cart 40 goes into the hole via the connection route between the holes. The marker line 20 comprising the magnetic elements 10 of the S pole is formed under the ground surface of the connection route. The magnetic sensor of the cart 40 reads the magnetic poles of the magnetic elements 10, and the cart 40 runs on the predetermined route along the line 20. When the cart 40 passes the travel switching detector 50, and the magnetic sensor thereof reads the pole arrangement, "N N S N N", the carts 40 run by the respectively set distances $l_1$ to $l_3$ on the determined route, and turn the steering angles at the different positions and thereafter go into the fairway. When running on the predetermined distances, the carts 40 advance while turning the steering angles in opposition with respect to the marker line, and hence the carts 40 return to the marker line 20. After sensing the marker line 20, the carts 40 run on the predetermined route as tracing along the line 20, and direct toward a next hole.

A second embodiment of this invention will be described in detail referring to FIGS. 5 and 6. As shown in FIG. 5, the magnetic elements 10 are buried in a suitable depth under the ground surface in the golf course to form marker lines 20 and 30 in the running direction of the cart 40.

The marker line 20 comprises the magnetic elements 10 of the S poles except the travel switching sensor 50 similarly to the first embodiment. In this embodiment, the marker line 20 is formed in a single line on the connection route from the hole to the hole. The travel switching detector 50 is formed of "N N S N N" arrangement of a combination of the five magnetic elements 10 of the S poles or the N poles similarly to the first embodiment.

The marker line 30 is formed of all the magnetic elements 10 of the N poles, in a plurality of lines in parallel on the fairway in this embodiment, similarly to the case disclosed in Japanese Patent Laid Open No. 118704/90.

The marker line 20 is a part for traveling the cart 40 on the predetermined route, and the marker lines 30 are parts for traveling the cart 40 at random therebetween.

The marker line 30 may be formed in a single line as disclosed in Japanese Patent Laid Open No. 6884/93, and this arrangement of the marker line 30 will be described later. The marker lines 20 and 30 may be also formed as drawing a suitable curve following the configuration of the ground of the holes.

The cart 40 has, similarly to the first embodiemnt, a magnetic sensor for sensing the poles of the buried magnetic elements 10 and its magnetic force and a controller for controlling the steering of the traveling cart based on an output issued from the sensor.

The controller has a pole discriminating circuit which discriminates the pole sensed by the magnetic sensor via said circuit to automatically select the travel of the cart 40 on the predetermined route or the random route. In this embodiment, as described above, since the line 20 of the connection route necessary for the cart 40 to run on the predetermined route is formed of the magnetic elements 10 of the S poles, and the lines 30 of the fairway necessary for the cart 40 to run on the random route are formed of the magnetic elements 10 of the N poles, the pole discriminating circuit controls the steering of the cart 40 to run On the predetermined route when the pole discriminating continuously discriminates the S poles, or to run on the random route when the pole discriminator continuously discriminates the N poles. The steering control of the predetermined route and the random route will be set forth later.

The pole discriminator can read the arbitrary pole arrangement, and when reading it, the golf cart 40 is traveled as it is, after sensing, at the arbitrary distance l, and then advances, after said traveling, while turning the steering angle of the cart 40. In this embodiment, the pole arrangement "N N S N N" of the travel switching detector 50 is formed arbitrarily, and when reading the pole arrangement, the cart is controlled as described above. In this control, the running distances l are set differently per each cart 40. More specifically, as shown in FIG. 6, the cart 40d is set as $l_4$, the cart 40e is set as $l_5$, the cart 40f is set as $l_6$, the cart 40g is set as $l_7$, and the cart 40h is set as $l_8$. Further, the running distances l are so controlled to be changed in a range where the carts 40d to 40h do not travel the same route according to the number of the times the arbitrary pole arrangement is sensed (for example, the cart 40d runs from A to B, the cart 40e runs from B to C, the cart 40f runs from C to D, the cart 40g runs from D to E, and the cart 40h runs from E to F). In order to conduct such control, the controller has a random number table for selecting an arbitrary distance for each of the carts to run. Since the positions of turning the steering angles of the carts 40 are different by said control according to the carts 40d to 40h and since the positions are varied whenever the same cart 40 passes the holes, the number of times of passing of the cart along the same route is much reduced.

The predetermined route of the cart 40 is controlled in that the magnetic sensors are provided at the right and left sides of the cart and the cart 40 is guided to be just located on the marker line 20 where the sensed magnetic forces of the right and left magnetic sensors become equivalent. On the other hand, the random running is similar to the control disclosed in Japanese Patent Laid Open No. 118704/90. That is, when the cart 40 is traveled between the marker lines 30 and either of the right or left magnetic sensors the cart 40 senses either of the marker lines 30, the steering angle of the cart is turned toward the marker line 30 of the other side. The turning of the steering angle may be executed at the ground point where the marker line is sensed, or as shown in FIG. 5, in this embodiment, the turning is executed after the cart is advanced for several seconds along the line from the sensed ground point. The marker line 30 of the random running part is sufficient with a single line. The single line is similar to the control disclosed in Japanese Patent Laid Open No. 6884/93. In this case, there are considered two ways of the control for traveling the cart on the random course at one side of the marker line 30 as shown in FIG. 7, and the control for traveling the cart on the random course to cross the marker lines 30 as shown in FIG. 8. More specifically, the former turns the steering angle of the cart 40 in one direction with respect to the marker line when the magnetic sensor of the cart 40 senses the marker line 30 and turns the steering angle of the cart 40 in the opposite direction after the cart 40 runs for several seconds, and the latter turns the steering angle of the cart in the opposite direction after several seconds when the amgnetic sensor senses the marker line 30.

Further, the steering angle of the cart of this embodiment is constant, as shown in FIG. 9, until several seconds after the steering angle of the cart is turned, but thereafter it is so controlled as to freely change in a range of ±7°. In order to control in this manner, the controller has a random number table for selecting an arbitrary turning angle of a range of ±7° (using sixteen ways herein). The control of changing the steering angle may also be conducted at turning ground points A' to E'.

An example of the running of the cart of the second embodiment as described above will now be described with reference to FIGS. 5, 6 and 9.

The cart 40 enters the hole via the connection route between the holes. The marker line 20 comprising the magnetic elements 10 of the S pole is formed under the ground surface of the connection route. The magnetic sensor of the cart 40 reads the magnetic poles of the magnetic elements 10, and the cart 40 runs on the predetermined route along the line 20. When the cart 40 passes the travel switching detector 50, and the magnetic sensor reads the pole arrangement, "N N S N N", each cart 40 runs past the respectively set distances $L_4$ to $L_8$ on the predetermined route, and the carts 40 turn at the steering angles at the different positions and thereafter advance into the fairway. In this case, if the carts 40 have already read the pole arrangement in the other hole or in this hole, the distances $L_4$ to $L_8$ set in the respective carts $40d$ to $40h$ are slightly deviated in an optional range, and even the same carts 40 never start turning at the steering angle from the same position. As shown in FIG. 9, the steering angles to be turned of the carts 40 are arbitrarily changed in a range of ±7° after having run on the predetermined distance, and the carts 40 then advance. When the carts 40 advance to the one marker line 30 and the magnetic sensors of the carts read the N poles, the carts advance along the line 30 for several seconds, the carts 40 are then turned at the steering angles in a direction of the marker line 30 of the other side, and travels repeatedly until the marker line 20 of the S poles are sensed to continue the random running.

According to the first and second embodiments, as apparent from the running examples thereof, the starting positions of turning the steering angles of the carts $40a$ to $40h$ are different even under the control of running in both embodiments, that is, the positions of starting the random running from the predetermined route are different, the carts 40 do not almost pass the same route thereby to eliminate a problem of damaging the lawn, and automatic running of the carts 40 and the automatic switching of the running between the predetermined route and the random route can be completely conducted.

This invention can be applied to guiding of the unmanned carts in the golf courses, and further the invention can also be applied to any unmanned carts to be used for an industry, such as carts in factories.

We claim:

1. A method of moving and guiding the travel along a golf course of golf carts equipped with cart guide sensing means, the method comprising the steps of
   (a) forming at least one marker line by laying cart guides on or under the ground surface;
   (b) providing a travel switching detector at an arbitrary location on or in the vicinity of the marker line;
   (c) moving a plurality of golf carts along the marker line until said travel switching detector is sensed;
   (d) continuing the movement of said golf carts along the marker line after sensing the travel switching detector for a distance that is different for each of said golf carts;
   (e) advancing the golf cart in a predetermined direction with respect to the marker line by changing the steering angle of the golf cart after said distance along the marker line is traversed; and
   (f) advancing the golf cart in a direction opposite to the predetermined direction by changing the steering angle of the golf cart.

2. The method as claimed in claim 1 wherein the distance that each golf cart is moved after sensing the travel switching detector is changed within a range of distances each time the golf cart senses the travel switching detector.

3. The method as claimed in claim 1 wherein the predetermined direction of the golf cart advance is changed by changing the steering angle within a range of steering angles.

4. The method as claimed in claim 3 wherein the steering angle is changed each time the golf cart senses the travel switching detector.

5. The method as claimed in claim 1 wherein said forming step comprises forming a second marker line by laying cart guides on or under the ground surface at a location past said one marker line in the direction of golf cart movement, and wherein the steering angle of the golf cart is changed whenever the golf cart senses said second marker line.

6. The method as claimed in claim 5 wherein said forming step comprises forming a third marker line by laying cart guides on or under the ground surface at a location displaced from said second marker line, and wherein the golf cart steering angle is changed when the golf cart senses said third marker line.

7. The method as claimed in claim 5 wherein said forming step comprises forming said one marker line by laying magnetic elements of one magnetic pole on or under the ground surface and forming said second marker line by laying magnetic elements of an opposite magnetic pole on or under the ground surface.

8. The method as claimed in claim 7 wherein said providing step comprises providing a travel switching detector formed of a predetermined arrangement of opposite magnetic poles.

* * * * *